J. J. COSGROVE.
HOLLOW CERAMIC BUILDING BLOCK.
APPLICATION FILED MAY 6, 1920.

1,360,183.

Patented Nov. 23, 1920.

Inventor
Joseph J. Cosgrove
By Connolly Bros
Attorney

UNITED STATES PATENT OFFICE.

JOSEPH J. COSGROVE, OF RUTHERFORD, NEW JERSEY.

HOLLOW CERAMIC BUILDING-BLOCK.

1,360,183.  Specification of Letters Patent.  Patented Nov. 23, 1920.

Application filed May 6, 1920. Serial No. 379,274.

*To all whom it may concern:*

Be it known that I, JOSEPH J. COSGROVE, a citizen of the United States, residing at Rutherford, in the county of Bergen and State of New Jersey, have invented certain new and useful Improvements in Hollow Ceramic Building-Blocks, of which the following is a specification, reference being had therein to the accompanying drawing.

This invention has relation to hollow ceramic building blocks and has for its object the provision of a burned hollow building block of ceramic material having an integral portion of a hard and practically non-porous character and another integral portion of a comparatively soft and porous character.

In carrying my invention into effect I make the ceramic composite block which constitutes my invention in such manner that the block will have a sufficient amount of bearing strength or high crushing strength and will have that portion which will be exposed to wet or moisture of hard and substantially non-porous or non-absorbent character and that portion which will not be so exposed of a comparatively soft and porous character so as to permit of nails and like articles being readily driven into it and securely held, practically in the same manner that nails are driven into and held in wood and so as to permit of the surface being plastered without the necessity of grooves, scores or other expedients for anchoring the plaster to the tile.

Ordinarily burned hollow ceramic building blocks are made in a variety of grades, such as very hard burned, standard, hard burned, ordinary or medium burned, all of which are known as dense blocks; while other less dense and less hard blocks are known as porous blocks.

Dense blocks are usually made from clay without the admixture of any other substance, while porous blocks are made by mixing sawdust, granulated coal, or other combustible material, with the clay, which combustible material is consumed in the firing process, leaving the product with a cellular, sponge-like structure.

The respective characteristics of dense and porous building blocks being radically different, they are not adapted for satisfactory use under similar conditions. Thus dense building blocks having high bearing or crushing strength and little porosity, are best adapted for outside walls, but nails or other similar articles can not be driven into dense blocks, while porous blocks are so absorbent and so soft that they can not be advantageously used for outside walls, but are well adapted for inside walls and partitions by reason of the ease with which nails and other similar articles can be driven into them for fastening trim, rails, brackets, shelves and the like to the wall, and for the reason that plaster or similar coating can be applied directly to them and will firmly adhere because of the cellular structure and rough surface which needs no grooves for the anchorage of the plaster and therefore a thinner coat and less plaster need be used.

My improved building blocks being dense and hard in those parts exposed to wet or moisture and subject to heavy weight or pressure and being soft and porous in those parts not so exposed, possess in a single integral block or piece the characteristics and advantageous feature of both dense and porous building blocks.

In the accompanying drawing, illustrating my invention,

Figure 1:
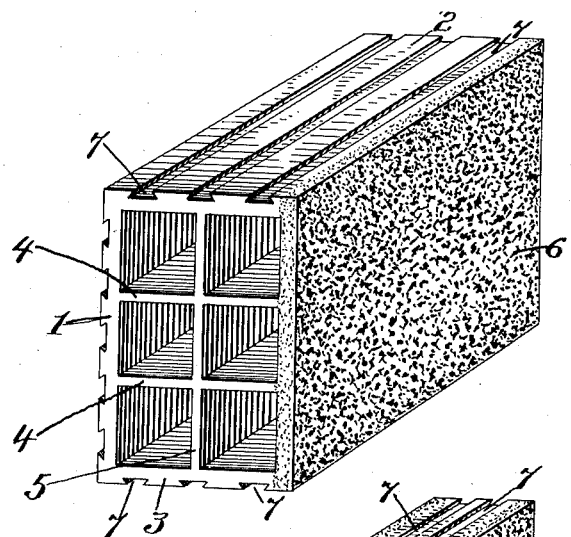
Figure 1, is a perspective view of one form of my improved building block.

In the form shown in Fig. 1, the outer wall of the block is designated 1, the upper wall 2, the lower wall 3, the horizontal partitions 4, and the vertical partitions 5, all these named parts of the block being composed of dense ceramic material, while the inner wall of the block designated 6, is composed of porous ceramic material, the two materials of the block being so united while in a plastic state that when baked or fired, the finished block will be one-piece or integral throughout.

The outer wall 1, the upper wall 2 and the lower wall 3, of the block shown in Fig. 1, are each formed with longitudinally disposed dovetail grooves 7, to receive a portion of and form anchoring means for the mortar or cement between blocks and the external coating of the wall.

Figure 2:
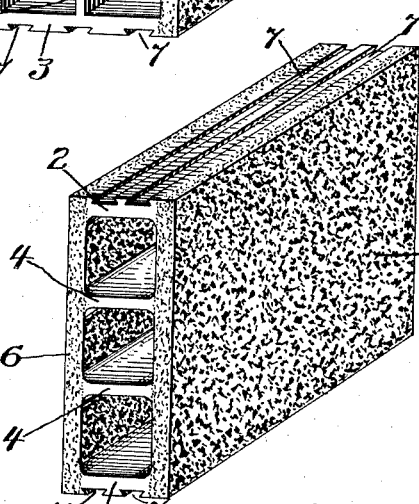
Fig. 2, is a perspective view of a modified form of the same, particularly adapted for use in the construction of partition and like inside walls.

In Fig. 2, I have shown a building block particularly adapted for use in internal partition walls and the like where two sides of the block are exposed inside the building, this block being formed with vertical external walls 6, 6, of porous ceramic material, while the upper wall 2, the lower wall 3, and the horizontal partitions 4 are of dense ceramic material, the upper wall 2 and the lower wall 3, being formed with dovetail grooves 7, for the reception of mortar or cement.

Figure 3:
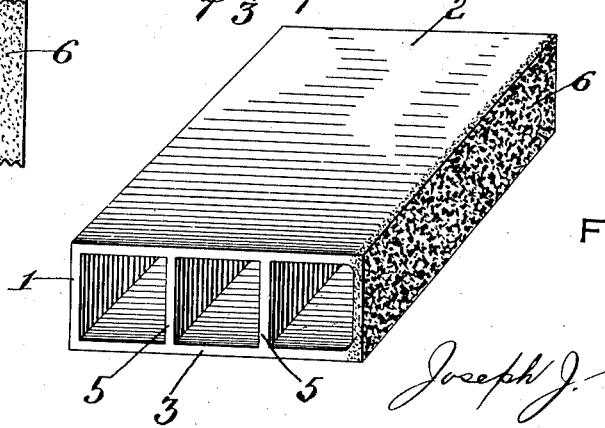
Fig. 3, is a perspective view of a building block similar to the one shown in Fig. 1, but with horiontal cells only.

In Fig. 3, I have shown a flat building block having a single row of horizontally disposed cells, but the building block shown in this figure corresponds substantially in structure to the block shown in Fig. 1.

Figure 4:
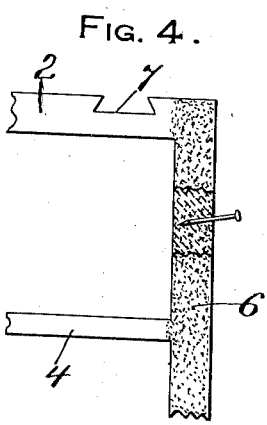
Fig. 4, is a fragmentary end view partly in section and on an enlarged scale of a portion of the building block shown in Fig. 1.

Fig. 4, which is an enlarged view of one corner of the block shown in Fig. 1, shows the manner in which a nail or other article may be driven into the porous portion 6, of the block.

I claim:

1. A hollow burned, ceramic building block composed in part of dense ceramic material and in part of porous ceramic material.

2. A hollow burned, ceramic building block having an outer wall composed solely of dense ceramic material and the opposite wall composed solely of porous ceramic material.

3. A burned, hollow, integral, ceramic building block having a top, a bottom and one side wall composed of dense ceramic material and the other side wall composed solely of porous ceramic material.

4. A burned, hollow, intergral ceramic building block having one side wall, a top wall, a bottom wall and internal partitions all composed of dense ceramic material and having the other side wall composed of porous ceramic material.

5. A hollow building block composed of burnt ceramic material having a soft, porous or cellular side wall, adapted for the penetration of nails or like articles and an opposite integral side wall of dense, hard non-absorbent, impenetrable material.

6. A hollow, integral, burnt clay building block characterized by the fact that the block is composed of opposite walls and connecting webs molded while in a plastic state into an integral whole, one of said walls being of a hard, dense non-cellular character and the other of said walls being of a comparatively soft, cellular character and penetrable by driven nails and the like.

7. A burnt clay building block composed of front and back walls and connecting webs with included air spaces, one of the walls being comparatively soft, porous and penetrable by driven nails and the like, and the opposite wall being dense, hard and impenetrable, the block having the characteristics of an article molded from a mass of moist kneaded clay with part of which has been incorporated a combustible material in small particles and the latter incinerated in the burning operation, so as to leave said part in a porous or cellular condition.

In testimony whereof I have affixed my signature in presence of two witnesses.

JOSEPH J. COSGROVE.

Witnesses:
 FRANK A. HALL,
 DAVID STODDARD.